Jan. 31, 1933.   W. J. VANSTORY   1,895,949
MILK COOLER
Filed Jan. 8, 1930
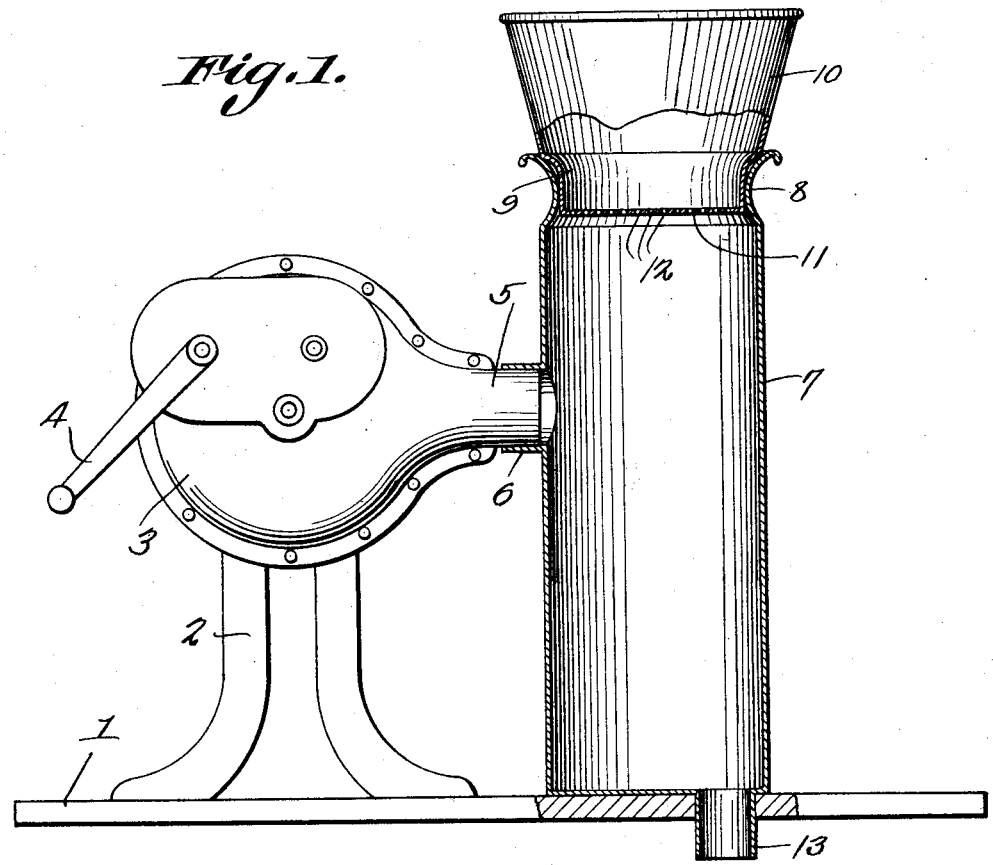
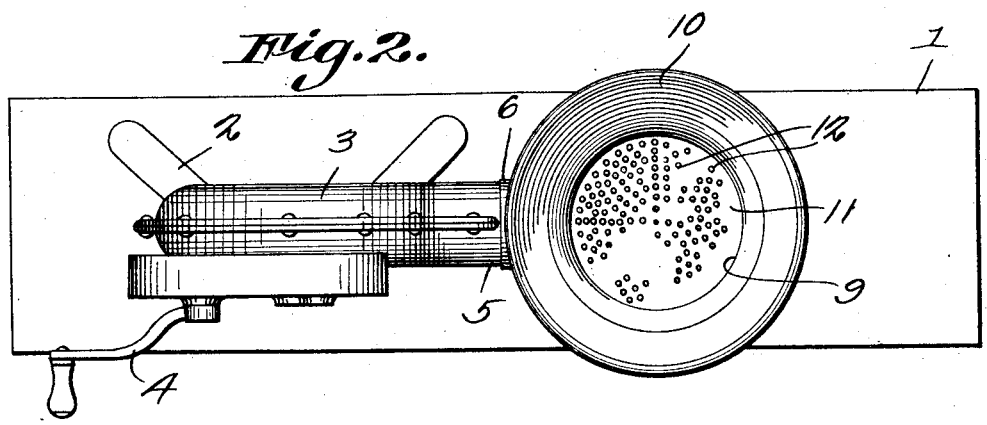
W. J. Vanstory
Inventor
By C. A. Snow & Co.
Attorneys.

Patented Jan. 31, 1933

1,895,949

UNITED STATES PATENT OFFICE

WILLIAM J. VANSTORY, OF BOONEVILLE, MISSISSIPPI, ASSIGNOR OF ONE-HALF TO WILLIAM H. MILLER, OF BOONEVILLE, MISSISSIPPI

MILK COOLER

Application filed January 8, 1930. Serial No. 419,392.

This invention relates to apparatus for cooling milk, one of the objects being to provide a simple, compact and efficient structure which can be operated either by hand or by motor and has the minimum number of parts so that the structure will not easily get out of order.

Another object is to provide a milk cooler which can be easily cleaned.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawing the preferred form of the invention has been shown.

In said drawing,

Figure 1 is a view partly in side elevation and partly in section of the complete apparatus.

Figure 2 is a plan view.

Referring to the figures by characters of reference, 1 designates a base on which is arranged a pedestal 2 carrying the housing 3 of a blower. This blower can be operated by a crank arm 4 or a motor, not shown, could be used for actuating it. The blower housing has an outlet nozzle 5 on which is detachably mounted a sleeve 6 extending radially from the intermediate portion of the cylindrical body 7 of the cooler. This body has a contracted upper portion forming a neck 8 in which is seated the reduced lower end portion 9 of a container 10. This container is open at the top and has its bottom 11 formed with perforations indicated at 12.

An outlet 13 is provided in the lower end of the body 7 for the passage of air and milk.

In practice, the blower is set in motion and the milk to be cooled is poured into the container 10. From this container the milk will flow in small streams and as these streams gravitate within the body 7 the air-blast from the nozzle 5 will carry off the heat contained in the milk. The milk will flow into the outlet 13 and thence into a shipping can or the like provided therefor while the air carrying the removed heat units, will also escape through said outlet and be dissipated.

It has been found in practice that milk can be cooled quickly by means of apparatus such as herein described. The apparatus has also been found advantageous because the body 7 can be easily removed from nozzle 5 and the several parts quickly and thoroughly cleaned.

What is claimed is:

A milk cooler including a body open at the top and bottom, a receptacle removably mounted in the upper end of the body and having a flat bottom provided with a plurality of minute apertures for delivering milk in fine streams longitudinally of the body toward the bottom opening, there being an inlet between the open top and bottom constituting the sole opening in the wall of the body, a blower having an outlet nozzle opening through the inlet for directing a current of air transversely across the body between the fine streams of milk and against the opposed wall, said air being adapted to escape solely along lines substantially parallel with the streams of milk to the openings at the top and bottom, thereby prolonging contact of the fine streams of milk with the cooling air current.

In testimony that I claim the foregoing as my own, I have hereto affixed my signature.

WILLIAM J. VANSTORY.